United States Patent [19]
Hanel et al.

[11] Patent Number: 5,183,571
[45] Date of Patent: Feb. 2, 1993

[54] MULTILAYER MEMBRANE AND PROCESS OF MANUFACTURING THE SAME

[75] Inventors: Peter Hanel, Bad Vilbel; Harald Helmrich, Frankfurt; Ulrich Sander, Friedrichsdorf, all of Fed. Rep. of Germany

[73] Assignee: Metallgesellschaft Aktiengesellschaft, Frankfurt, Fed. Rep. of Germany

[21] Appl. No.: 653,653

[22] Filed: Feb. 11, 1991

[30] Foreign Application Priority Data

Feb. 10, 1990 [DE] Fed. Rep. of Germany ....... 4004153

[51] Int. Cl.$^5$ .................... B01D 39/16; B01D 61/36; B01D 71/38
[52] U.S. Cl. ....................... 210/649; 55/16; 55/158; 55/524; 55/DIG. 5; 156/281; 210/321.84; 210/490; 210/500.42; 210/506; 210/644; 210/908; 427/381; 427/394; 427/407.1; 428/215; 428/285; 428/286; 428/287; 428/311.5; 428/316.6; 428/319.3

[58] Field of Search ............ 210/490, 500.21, 321.84, 210/490, 506, 649, 908, 500.42; 428/285, 215, 251, 286, 252, 287, 316.6, 311.5, 319.3; 427/381, 394, 407.1; 156/281; 55/16, 158, 524, DIG. 5

[56] References Cited

U.S. PATENT DOCUMENTS

| | | | |
|---|---|---|---|
| 4,619,767 | 10/1986 | Kamiyama et al. | 210/500.42 |
| 4,753,725 | 6/1988 | Linder et al. | 210/500.42 |
| 4,915,834 | 4/1990 | Brunschke | 210/500.42 |

*Primary Examiner*—James C. Cannon
*Attorney, Agent, or Firm*—Michael J. Striker

[57] ABSTRACT

A multilayer membrane is composed of a carrier layer, a porous supporting layer and a separating layer. The carrier layer consists of fibers of polyamide, polyvinylidene difluoride, polyester or glass; the porous supporting layer consists of a polysulfone, polyvinylidene difluoride, polyethersulfone, polyimide, polyvinyl alcohol, polyurethane, polyacrylonitrile or polyether imide; the separating layer consists of polyvinyl alcohol. The separating layer is nonporous and has a structure having a high microcrystalline content. A process of manufacturing that membrane is also described.

13 Claims, No Drawings

MULTILAYER MEMBRANE AND PROCESS OF MANUFACTURING THE SAME

BACKGROUND OF THE INVENTION

The invention relates to a multilayer membrane, which is composed of a carrier layer, a porous supporting layer and a separating layer, and to a process of manufacturing the same.

European Patent Specification EP 96 339 B1 has already disclosed a composite membrane comprising a nonporous separating layer made of a first polymer and a porous supporting layer made of a second polymer, wherein the nonporous separating layer consists of cross-linked polyvinyl alcohol or cellulose triacetate and the polymer used for the separating layer of the membrane has not entered the pores of the supporting layer. It is also known from that European patent specification that the porous supporting layer has been applied to a nonwoven fabric or a woven cloth used as a carrier layer and that the porous supporting layer consists of polyacrylonitrile or polysulfone. It has also been proposed in that European patent specification that the cross-linked separating layer made of polyvinyl alcohol has been cross-linked by etherification, esterification or acetalization or by a combination of said processes and has been rendered water-insoluble by an action of heat. The laminated membrane known from the above-mentioned European Patent Specification can desirably be used to separate liquid mixtures by pervaporation. But it has been found that the separating capacity of the known laminated membrane—i.e. the rate at which the mixed material is separated into its constituents per square meter of the membrane surface area—is only low and that the separating capacities of individual membranes differ and vary during continuous operation.

SUMMARY OF THE INVENTION

For this reason it is an object of the invention to provide a multilayer membrane which has a high and constant separating capacity and which does not exhibit an undesirable change in separating capacity in continuous operation. Another object underlying the invention is to provide a process of manufacturing such a laminated membrane.

The object underlying the invention is accomplished in that the carrier layer of the membrane consists of fibers of polyamide, polyvinylidene difluoride, polyester or glass, the porous supporting layer consists of a polysulfone, polyvinylidene difluoride, polyethersulfone, polyimide, polyvinyl alcohol, polyurethane, polyacrylonitrile or polyether imide, the separating layer consists of polyvinyl alcohol, the separating layer is nonporous and has an ordered structure having a high microcrystalline content, the crystallites of which exhibit in the X-ray diffraction pattern a reflection of a range of 1.2 to 1.5 degrees at diffraction angles H 2 O of 19.6° to 20°.

When the multilayer membrane is designed in accordance with the present invention it eliminates the disadvantages of the prior art and achieves the above mentioned objects.

Another object of the present invention is accomplished by a process which serves to manufacture the multilayer membrane and in which a composite material is initially made from the carrier material and the porous supporting layer, a diluted solution which contains 1 to 20% by weight polyvinyl alcohol, balance water, and which before use has been stored in a diluted or undiluted state at temperatures from −10° to +10° C., preferably 0° to +5° C., for 3 to 20 days, is subsequently applied to the supporting layer of the composite material, and the composite material coated with the aqueous solution of polyvinyl alcohol is treated at a temperature from 100° to 180° C. for 1 to 60 minutes.

The novel features of the present invention will be set forth in particular in the appended claims; the invention itself, will be explained in detail in the following complete description.

DESCRIPTION OF THE PREFERRED EMBODIMENTS

In accordance with the present invention a multilayer membrane is provided. The membrane includes a carrier layer of the membrane consists of fibers of polyamide, polyvinylidene difluoride, polyester of glass, the porous supporting layer consists of a polysulfone, polyvinylidene difluoride, polyethersulfone, polyimide, polyvinyl alcohol, polyurethane, polyacrylonitrile or polyether imide, the separating layer consists of polyvinyl alcohol, the separating layer is nonporous and has an ordered structure having a high microcrystalline content, the crystallites of which exhibit in the X-ray diffraction pattern a reflection in a range of 1.2 to 1.5 degrees at diffraction angles H 2 Ø of 19.6° to 20°.

Diffractometric measurements of texture have shown that the lattice planes of the polyvinyl alcohol crystallites which reflect at a diffraction angle H 2 Ø from 19.6 to 20 degrees are preferentially planoparallel to the surface of the porous supporting layer so that they constitute a micro-crystalline layer structure in the nonporous separating layer. Another proof of the high microcrystalline content in the structure of the nonporous separating layer is furnished by a differential scanning calorimetric analysis (DSC), which between 160° and 200° C. indicates a sharp endothermic peak such as is to be expected for mixed crystallites of polyvinyl alcohol. The high microcystalline content of the structure of the nonporous separating layer is also shown by an intense peak obtained at 1142 to 1146 $cm^{-1}$ in an analysis by infrared spectroscopy. Surprisingly it has been found that the separating layer consisting of polyvinyl alcohol will exhibit a high and constant separating capacity if it has the ordered mycrocrystalline structure called for by the invention and is bonded to the carrier layer called for by the invention and to the porous supporting layer called for by the invention.

The multilayer membrane composed in accordance with the invention will have particularly good properties in use (a high mechanical strength and an almost constant separating capacity in continuous operation) if the carrier layer has a thickness from 30 to 500 μm, the porous supporting layer has a thickness from 30 to 200 μm and the separating layer has a thickness from 0.5 to 5 μm.

The multilayer membrane in accordance with the present invention is produced by an inventive process. In accordance with the inventive process a composite material is initially made from the carrier material and the porous supporting layer, a diluted solution which contains 1 to 10% by weight polyvinyl alcohol, balance water, and which before use has been stored in a diluted or undiluted state at temperatures from −10° to +10° C., preferably 0° to +5° C., for 3 to 20 days, is subsequently applied to the supporting layer of the composite material, and the composite material coated with the aqueous solution of polyvinyl alcohol is treated at a temperature from 100° to 180° C. for 1 to 60 minutes. Surprisingly it has been found that the separating layer consisting of polyvinyl alcohol will have a high and constant separating capacity if it has been made by the process described hereinbefore and that the ordered microcrystalline structure of that layer will surprisingly be formed if in accordance with the invention the solution is stored at low temperatures and the coated composite material is treated at elevated temperatures.

In accordance with a further feature of the invention the aqueous solution of polyvinyl alcohol before it is stored has a degree of saponification of 98 to 100% and a molecular weight of 10,000 to 250,000 daltons. Because the polyvinyl alcohol solution to be used in accordance with the invention is produced by a saponification of polyvinyl acetate, the degree of saponification of as many as possible of the ester groups of the polyvinyl acetate.

It is also called for by the invention that the polyvinyl alcohol solution applied to the composite material is prepared in that a concentrated polyvinyl alcohol solution which contains 8 to 20% by weight polyvinyl alcohol, balance water, is diluted with water, which concentrated solution has been stored at temperatures from $-10°$ to $+10°$ C., preferably 0° to $+5°$ C., for 3 to 20 days before it is diluted. Surprisingly it has been found that the favorable influence of the long-time storage on the properties of the separating layer will also be achieved if a concentrated aqueous solution of polyvinyl alcohol is stored at temperatures from $-10°$ to $+10°$ C. for 3 to 20 days and only immediately before the application to the composite material is diluted to a concentration of 1 to 10% by weight polyvinyl alcohol.

The membrane in accordance with the invention will have particularly good separating properties if the aqueous solution immediately before it is applied to the composite material is filtered through a filter having pores which are 40 to 100 $\mu$m in diameter. As a result of that measure, relatively coarse solid agglomerates which may have formed during the long-time storage of the polyvinyl alcohol solution will be separated and the homogeneity of the separating layer will be improved because an occurrence of lattice defects in the ordered microcrystalline structure can be avoided by the filtration called for by the invention.

In accordance with the invention, 0.01 to 0.1% by weight of a wetting agent are desirably added to the aqueous solution of polyvinyl alcohol immediately before it is applied to the composite material. This will result in an effective and uniform wetting of the porous supporting layer.

Also in accordance with the invention a cross-linking agent in an amount of 1 to 10% by weight, based on the polyvinyl alcohol content of the solution, is added to the aqueous solution of polyvinyl alcohol immediately before that solution is applied to the composite material. By that measure, which is known per se, the properties of the separating layer can be varied and can be adapted to specific separation requirements. The cross-linking agents may consist, e.g., of di- or multifunctional carboxylic acids, aldehydes or halogenated hydrocarbons.

It has been found that it will be desirable in some cases within the scope of the invention to irradiate the coated composite material with microwave before it is treated at elevated temperatures. This irradiation will result in a comparatively fast drying of the separating layer so that the effect of the subsequent treatment at an elevated temperature, which effect particularly results in the uniform formation of an ordered microcrystalline structure, will not adversely be affected by an evaporation of water from the separating layer.

In order to avoid a formation of pores within the separating layer that layer is desirably formed in a plurality of partial steps (each of which consists of the application of the solution and the thermal treatment). Surprisingly it has been found that the separating layers formed in partial steps have no internal interfaces.

The multilayer membrane in accordance with the invention can be used to special advantage for a separation of liquid, vaporous and gaseous mixtures. During a long-time use of that membrane there will be no undesirable decrease of the separating capacity and the membrane will retain its mechanical properties even in long-time operation. The membrane has been used with special satisfaction in pervaporating processes.

The subject matter of the invention will now be explained more in detail with reference to an example.

A completely saponified polyvinyl alcohol was dissolved in distilled water at a temperature from 90° to 95° C. within 3 to 5 hours. The resulting solution contained 10% by weight polyvinyl alcohol, which had a degree of saponification of 99% and a molecular weight of 100,000 daltons. That solution was stored at 0° C. for 72 hours. Turbidity occurred and the viscosity of the solution increased in storage. This is believed to be due to associations of the macromolecules of the polyvinyl alcohol. The solution which had been stored at low temperatures was heated to room temperature and by an addition of water was diluted to a polyvinyl concentration of 5% by weight. The diluted solution was then filtered through a filter having a pore size of 80 $\mu$m. 0.1% by weight of a wetting agent was added to the filtered solution.

That solution was applied by means of a doctor blade to a composite material, which consisted of a carrier layer made of polyamide fibers and a porous supporting layer made of polyvinylidene difluoride. The carrier layer had a thickness of 300 $\mu$m and the porous supporting layer had a thickness of 100 $\mu$m. The composite material coated with the polyvinyl alcohol solution was treated at a temperature of 130° C. for 45 minutes. After the thermal treatment the separating layer had a thickness of 1.5 $\mu$m.

By X-ray diffraction analysis it was found that the separating layer reflected in a range of 1.25° at a diffraction angle H 2 $\theta$ of 19.82°. The intensity of the reflection from the separating layer of the membrane in accordance with the invention was evaluated at 100. In an X-ray diffraction analysis of the known laminated polyvinyl alcohol membrane it has been found that the separating layer reflected in a range of 1.65° at a diffraction angle H2 $\emptyset$ of 19.63° and that the intensity of the reflection was less than 50% of the intensity of the reflection from the membrane in accordance with the invention The X-ray diffraction analysis was performed with a computer-assisted diffractometer using CoK $\alpha$ and CuK $\alpha$ radiations. All specimens were prepared on sheet aluminum carrier because aluminum will not reflect X-rays at small diffraction angles, which are important for polymers. The thickness of the separating layer was determined by a scanning electron microscope, and the control specimen had a thickness of 1.6 $\mu$m. The results of the examination by X-ray diffraction indicate that in comparison with the known membrane the membrane in accordance with the invention has a high degree of order and a structure having a high microcrystalline content, which is responsible for the desirable performance and use properties of the membrane.

The membrane which was composed and had been manufactured in accordance with the invention was used in a trial for a separation of mixtures of 2-propanol and water for 6 weeks in continuous operation. This resulted in the following performance:

The mixture to be separated was composed of 90% by weight 2-propanol and 10% by weight water and the separation was effected at a temperature of 93° C. The permeate was obtained at a rate of 1.8 kg per square meter of membrane area and per hour and contained less than 1% by weight 2-propanol. The permeate contained more than 99% by weight water.

It will be understood that each of the elements described above, or two or more together, may also find a useful application in other types of constructions and methods differing from the types described above.

While the invention has been illustrated and described as embodied in a multi-layer membrane and a process for its manufacture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A multilayer membrane, comprising a carrier layer composed of fibers of a material selected from the group consisting of polyamide, polyvinylidene difluoride, polyester and glass; a porous supporting layer composed of a material selected from the group consisting of polysulfone, polyvinylidene difluoride, polyethersulfone, polyimide, polyvinyl alcohol, polyurethane, polyacrylonitrile and polyether imide; and a separating layer composed of polyvinyl alcohol, said separating layer being nonporous and having a structure having a high microcrystalline content with crystallites which exhibit in the X-ray diffraction pattern a reflection in a range of 1.2 to 1.5 degrees at diffraction angles H 2 $\emptyset$ of 19.6 to 20°.

2. A multilayer membrane as defined in claim 1, wherein said carrier layer has a thickness from 30 to 500 $\mu$m, said porous supporting layer having a thickness from 30 to 200 $\mu$m, said separating layer having a thickness from 0.5 to 5 $\mu$m.

3. A process of manufacturing a multilayer membrane including a carrier layer composed of fibers of a material selected from the group consisting of polyamide, polyvinylidene difluoride, polyester and glass; a porous supporting layer composed of a material selected from the group consisting of polysulfone, polyvinylidene difluoride, polyethersulfone, polyimide, polyvinyl alcohol, polyurethane, polyacrylonitrile and polyether imide; and a separating layer composed of polyvinyl alcohol, said separating layer being nonporous and having a structure having a high microcrystalline content with crystallites which exhibit in the X-ray diffraction pattern a reflection in a range of 1.2 to 1.5 degrees at diffraction angles H 2 $\emptyset$ of 19.6° to 20°, the process comprising the steps of making initially a composite material from the materials of said carrier layer and said porous supporting layer; subsequently applying to the supporting layer of the composite material a diluted solution which contains 1 to 10% by weight polyvinyl alcohol, balance water, and which before use has been stored in a diluted or undiluted state at temperatures from $-10°$ to $+10°$ C. for 3 to 20 days; and then treating the composite material with an aqueous solution of polyvinyl alcohol at a temperature from 100° to 180° C. for 1 to 60 minutes.

4. A process as defined in claim 3, wherein said applying step includes applying the diluted solution which has been stored at temperature from 0° to $+5°$ C.

5. A process as defined in claim 3, wherein said treating step includes treating with the aqueous solution of polyvinyl alcohol which before it is stored has a degree of saponification of 98 to 100% and a molecular weight of 10,000 to 250,000 daltons.

6. A process as defined in claim 3, wherein said treating includes treating with the aqueous solution of polyvinyl alcohol prepared so that a concentrated polyvinyl alcohol solution which contains 8 to 20% by weight polyvinyl alcohol, balance water, is diluted with water, which concentrated solution has been stored at temperatures from $-10°$ to $+10°$ C. for 3 to 20 days before it is diluted.

7. A process as defined in claim 6, wherein the concentrated solution has been stored at temperatures from 0 to $+5°$ C.

8. A process as defined in claim 3; and further comprising the step of filtering the aqueous solution of polyvinyl alcohol immediately before it is applied to the composite material, through a filter having pores which are 40 to 100 $\mu$m in diameter.

9. A process as defined in claim 3; and further comprising the step of adding 0.01 to 0.1% by weight of a wetting agent to the aqueous solution of polyvinyl alcohol immediately before it is applied to the composite material.

10. A process as defined in claim 3; and further comprising the step of adding a cross-linking agent in an amount of 1 to 10% by weight, based on the polyvinyl alcohol content of the solution to the aqueous solution of polyvinyl alcohol immediately before that solution is applied to the composite material.

11. A process as defined in claim 3; and further comprising the step of irradiating the coated composite material with microwaves before it is treated at the temperature of 100° to 180° C.

12. A process as defined in claim 3; and further comprising the step of producing the separating layer in a plurality of partial steps.

13. A method of separating liquid, vaporous and gaseous mixtures, comprising the steps of providing a multilayer membrane including a carrier layer composed of fibers of a material selected from the group consisting of polyamide, polyvinylidene difluoride, polyester and glass; a porous supporting layer composed of a material selected from the group consisting of polysulfone, polyvinylidene difluoride, polyethersulfone, polyimide, polyvinyl alcohol, polyurethane, polyacrylonitrile and polyether imide; a separating layer composed of polyvinyl alcohol, said separating layer being nonporous and having a structure having a high microcrystalline content with crystallites which exhibit in the X-ray diffraction pattern a reflection in a range of 1.2 to 1.5 degrees at diffraction angles H 2 $\theta$ of 19.6° to 20°; and using said membrane for separation of liquid, vaporous and gaseous mixtures.

* * * * *